United States Patent
Zuo et al.

(10) Patent No.: US 10,780,795 B2
(45) Date of Patent: Sep. 22, 2020

(54) BATTERY HEATING SYSTEM AND CONTROL METHOD THEREOF

(71) Applicant: Contemporary Amperex Technology Co., Limited, Ningde, Fujian (CN)

(72) Inventors: Xiyang Zuo, Ningde (CN); Zhimin Dan, Ningde (CN); Wei Zhang, Ningde (CN); Yizhen Hou, Ningde (CN); Guowei Li, Ningde (CN); Xingyuan Wu, Ningde (CN); Yanru Li, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 37 days.

(21) Appl. No.: 16/370,975

(22) Filed: Mar. 30, 2019

(65) Prior Publication Data

US 2020/0207237 A1 Jul. 2, 2020

(30) Foreign Application Priority Data

Dec. 29, 2018 (CN) .......................... 2018 1 1640742

(51) Int. Cl.
*B60L 58/27* (2019.01)
*B60L 58/12* (2019.01)
*B60L 50/51* (2019.01)

(52) U.S. Cl.
CPC ............ *B60L 58/27* (2019.02); *B60L 50/51* (2019.02); *B60L 58/12* (2019.02); *B60L 2210/40* (2013.01)

(58) Field of Classification Search
CPC .................................................. B60L 58/27
See application file for complete search history.

(56) References Cited

U.S. PATENT DOCUMENTS 9,902,284 B2 * 2/2018 Brandauer .......... H01M 10/625
10,439,259 B2 * 10/2019 Recouvreur ............ B60L 58/25
(Continued)

FOREIGN PATENT DOCUMENTS

CN 103560304 A 2/2014
CN 204289653 U 4/2015
(Continued)

OTHER PUBLICATIONS

PCT International Search Report for PCT/CN2019/129256, dated Mar. 27, 2020, 10 pages.
(Continued)

*Primary Examiner* — Hai L Nguyen
(74) *Attorney, Agent, or Firm* — Law Offices of Liaoteng Wang (57) ABSTRACT

The disclosure provides a battery heating system and a control method thereof. The system includes a first switch, a second switch, a switch component, a motor, and a main controller. The first switch, the second switch, the switch component and the main controller are integrated in a same housing. The main controller is to determine, based on a state parameter of the battery pack, that the battery pack needs to be heated, and to send a battery heating request to a vehicle controller, so as to enable the vehicle controller to send a battery heating instruction to the main controller according to the battery heating request in a case where a vehicle is in a static state and the motor is not operating; and to control, based on the battery heating instruction, the first switch, the second switch and the switch component so as to heat the battery pack.

20 Claims, 5 Drawing Sheets

(56) References Cited

U.S. PATENT DOCUMENTS

2019/0359061 A1\* 11/2019 Dan .................. H01M 10/6571
2019/0359082 A1\* 11/2019 Hou ........................ B60L 53/16

FOREIGN PATENT DOCUMENTS

| CN | 103560304 B | 5/2016 |
| CN | 104538701 B | 8/2016 |
| CN | 105932363 A | 9/2016 |
| CN | 107666028 A | 2/2018 |
| CN | 108016312 A | 5/2018 |
| CN | 108847513 A | 11/2018 |
| CN | 209479443 U | 10/2019 |
| CN | 110600833 A | 12/2019 |
| DE | 102014011828 A1 | 2/2016 |
| DE | 102015015007 A1 | 7/2016 |

OTHER PUBLICATIONS

The extended European search report dated Oct. 9, 2019 for European Application No. 19161114.4 7 pages.
The First Office Action and search report dated Jul. 23, 2020 for Chinese Application No. 201811640742.5, 16 pages.
The Examination report dated Jul. 9, 2020 for European application No. 19161114.4, 5 pages.

\* cited by examiner

Fig. 5

BATTERY HEATING SYSTEM AND CONTROL METHOD THEREOF

CROSS REFERENCE TO RELATED APPLICATION

The present application is based upon and claims the benefits of Chinese Patent Application No. 201811640742.5 filed on Dec. 29, 2018, the entire contents of which are incorporated herein by reference.

FIELD

The present disclosure generally relates to batteries, and more particularly to a battery heating system and a control method thereof.

BACKGROUND

Lithium batteries have various advantages, for example, they have high energy density and good safety, also, they are rechargeable, environmentally friendly and the like. Lithium batteries have been widely used in new energy vehicles, consumer electronics and energy storage systems. Especially in the field of new energy vehicles, countries around the world are vigorously supporting the development of the electric vehicle industry. However, use of lithium batteries in low temperature environments will be limited. Discharge capacity of the lithium batteries will be severely degraded at a low temperature, and the lithium batteries cannot be charged at the low temperature. Therefore, it is necessary to heat the power lithium batteries.

At present, an on-board power lithium battery may be heated via external heating methods. The external heating methods may mainly include, for example, air heating, liquid heating, phase-change material heating, thermal resistance heating and etc. The materials used in these external heating methods are typically packaged in a battery pack. Furthermore, these external heating methods require a dedicated thermal cycle vessel to indirectly heat the heat-conduction materials and conduct the heat to the power lithium battery through a special structural component. The heating method with external heat-conduction leads to low heating efficiency and high cost.

SUMMARY

According to an aspect of the embodiments of the disclosure, a battery heating system is provided. The system may be used to heat a battery pack and it may include a first switch connected to a positive electrode of the battery pack, a second switch connected to a negative electrode of the battery pack, a switch component connected between the first switch and the second switch, a motor connected to the switch component, and a main controller; wherein: the first switch, the second switch, the switch component and the main controller are integrated in a same housing; the main controller is configured to determine, based on a state parameter of the battery pack, whether the battery pack needs to be heated, and to send a battery heating request to a vehicle controller when it is determined that the battery pack needs to be heated, so as to enable the vehicle controller to send a battery heating instruction to the main controller according to the battery heating request in a case where it is determined that a vehicle is in a static state and the motor is not operating; and the main controller is configured to control, based on the battery heating instruction, the first switch, the second switch and the switch component so as to heat the battery pack.

According to an aspect of the embodiments of the disclosure, a method for controlling a battery heating system which is applied to the battery heating system in the embodiments of the disclosure. The method may include: determining, by the main controller based on the state parameter of the battery pack, whether the battery pack needs to be heated, and sending the battery heating request to the vehicle controller when it is determined that the battery pack needs to be heated, so as to enable the vehicle controller to send the battery heating instruction to the main controller according to the battery heating request in the case where it is determined that the vehicle is in the static state and the motor is not operating; and controlling, by the main controller based on the battery heating instruction, the first switch, the second switch and the switch component so as to heat the battery pack.

According to the battery heating system and the control method thereof, the structure is simple and the cost is reduced by integrating the first switch, the second switch, the switch component and the main controller in the same housing. On the basis of cost reduction, continuous alternating excitation current can be generated in a high voltage circuit where the battery pack is located with the control of the first switch, the second switch and the switch component by the main controller. The alternating excitation current may flow through the battery pack continuously, and the internal resistance of the battery pack is heated up, so that the battery(s) can be heated from the inside. As a result, the heating efficiency can be improved.

BRIEF DESCRIPTION OF THE DRAWINGS

In order to more clearly illustrate the technical solutions of the embodiments of the present disclosure, figures used in the embodiments of the present disclosure will be briefly described below. For those skilled in the art, other figures can be obtained from these figures without any creative work.

DETAILED DESCRIPTION

Various features and exemplary embodiments of the present disclosure will be described in detail below. The present disclosure will be further described in detail below with reference to the accompanying drawings and embodiments for clarity of the objects, technical solutions and advantages of the present disclosure. It is appreciated that the embodiments described herein are to be construed as illustrative only and not limiting. The present disclosure may be practiced without some of these specific details. The following description of the embodiments is merely provided to provide a better understanding of the disclosure.

It should be noted that, in this disclosure, relational terms such as "first" and "second", etc. are used merely to distinguish one entity or operation from another entity or operation, and do not necessarily require or imply that there is any actual relationship or order among these entities or operations. Furthermore, the term "comprise" or "include" or any other variants thereof is intended to encompass a non-exclusive inclusion, such that a process, method, article, or device that comprises a plurality of elements includes not only those elements but also other elements that are not listed explicitly or elements that are inherent to such a process, method, article, or device. An element that is defined by the phrase "comprise", does not exclude the presence of additional elements in the process, method, article, or device, if there is no other limitation.

Figure 1:
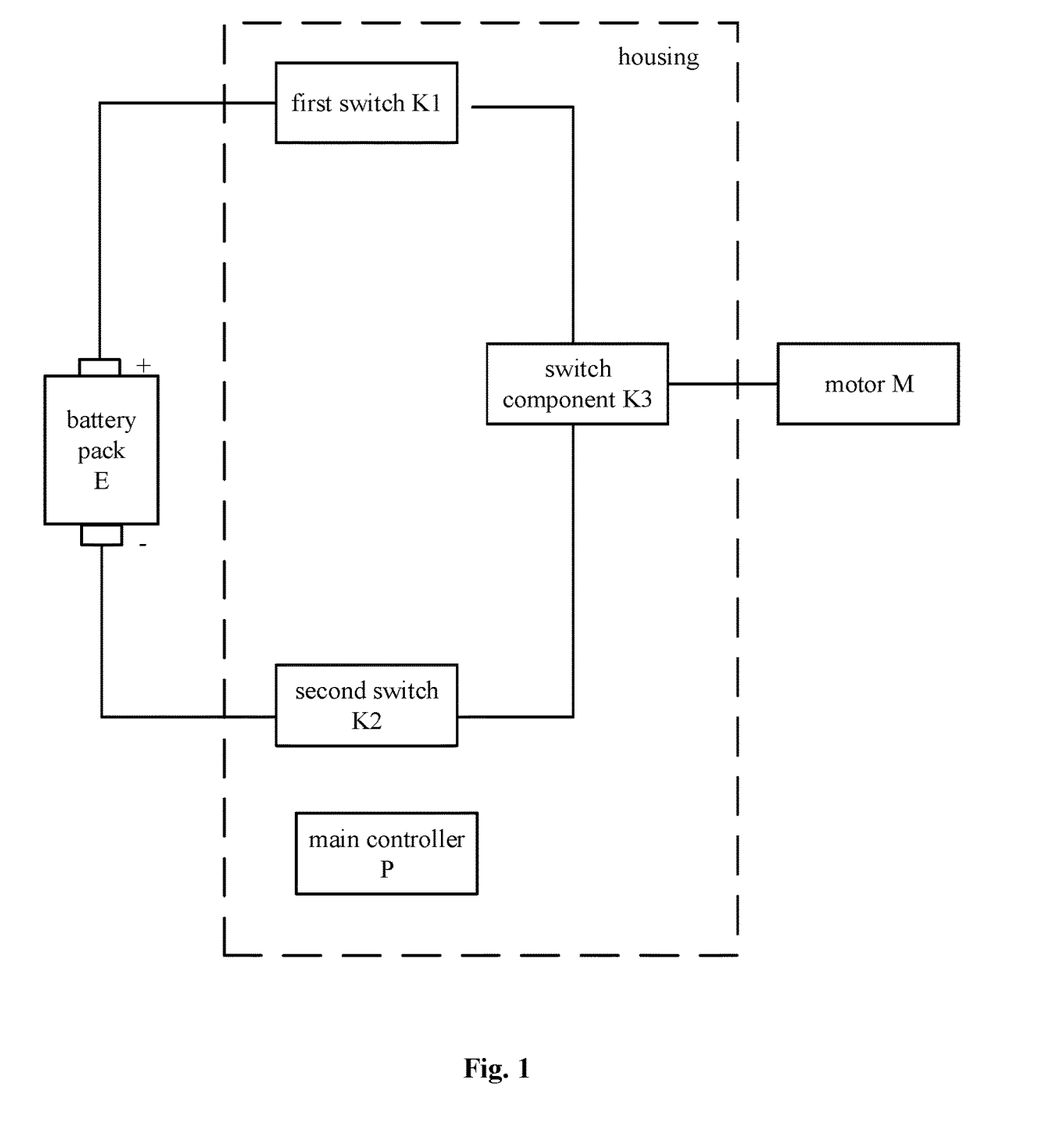
FIG. 1 illustrates a structure diagram of a battery heating system according to some embodiments of the present disclosure.

FIG. 1 illustrates a battery heating system according to some embodiments of the present disclosure. As shown in FIG. 1, the battery heating system may be used to heat the battery pack E. The system may include: a first switch K1 connected to a positive electrode of the battery pack E, a second switch K2 connected to s negative electrode of the battery pack E, a switch component K3 connected between the first switch K1 and the second switch K2, a motor M connected to the switch component K3, and a main controller P.

The first switch K1, the second switch K2, the switch component K3 and the main controller P may be integrated in the same housing.

The main controller P may be configured to determine whether the battery pack E needs to be heated based on a state parameter of the battery pack E, and to send a battery heating request to a vehicle controller when it is determined that the battery pack E needs to be heated, so as to enable the vehicle controller to send a battery heating instruction to the main controller P according to the battery heating request in a case where it is determined that a vehicle is in a static state and the motor M is not operating.

The main controller P may be configured to control, based on the battery heating instruction, the first switch K1, the second switch K2 and the switch component K3 so as to heat the battery pack E.

In some examples, the main controller P may be connected to the battery pack E (the connection is not shown) to obtain the state parameter of the battery pack E. The main controller P may be also connected to the switch component K3 (the connection is not shown) to control the switch component K3 to be turned off or turned on.

In some examples, the main controller P may also be connected to the first switch K1 and the second switch K2 (the connection is not shown) to control the closing and opening of the first switch K1 and the second switch K2.

The battery heating system provided in the embodiments of the disclosure may integrate the first switch K1, the second switch K2, the switch component K3 and the main controller P into the same housing. As a result, a simple structure can be obtained and the cost can be reduced. On the basis of cost reduction, continuous alternating excitation current can be generated in a high voltage circuit where the battery pack E is located with the control of the first switch K1, the second switch K2 and the switch component K3 by the main controller P. The alternating excitation current may flow through the battery pack E continuously, and the internal resistance of the battery pack is heated up, so that the battery(s) can be heated from the inside. As a result, the heating efficiency can be improved.

Figure 2:
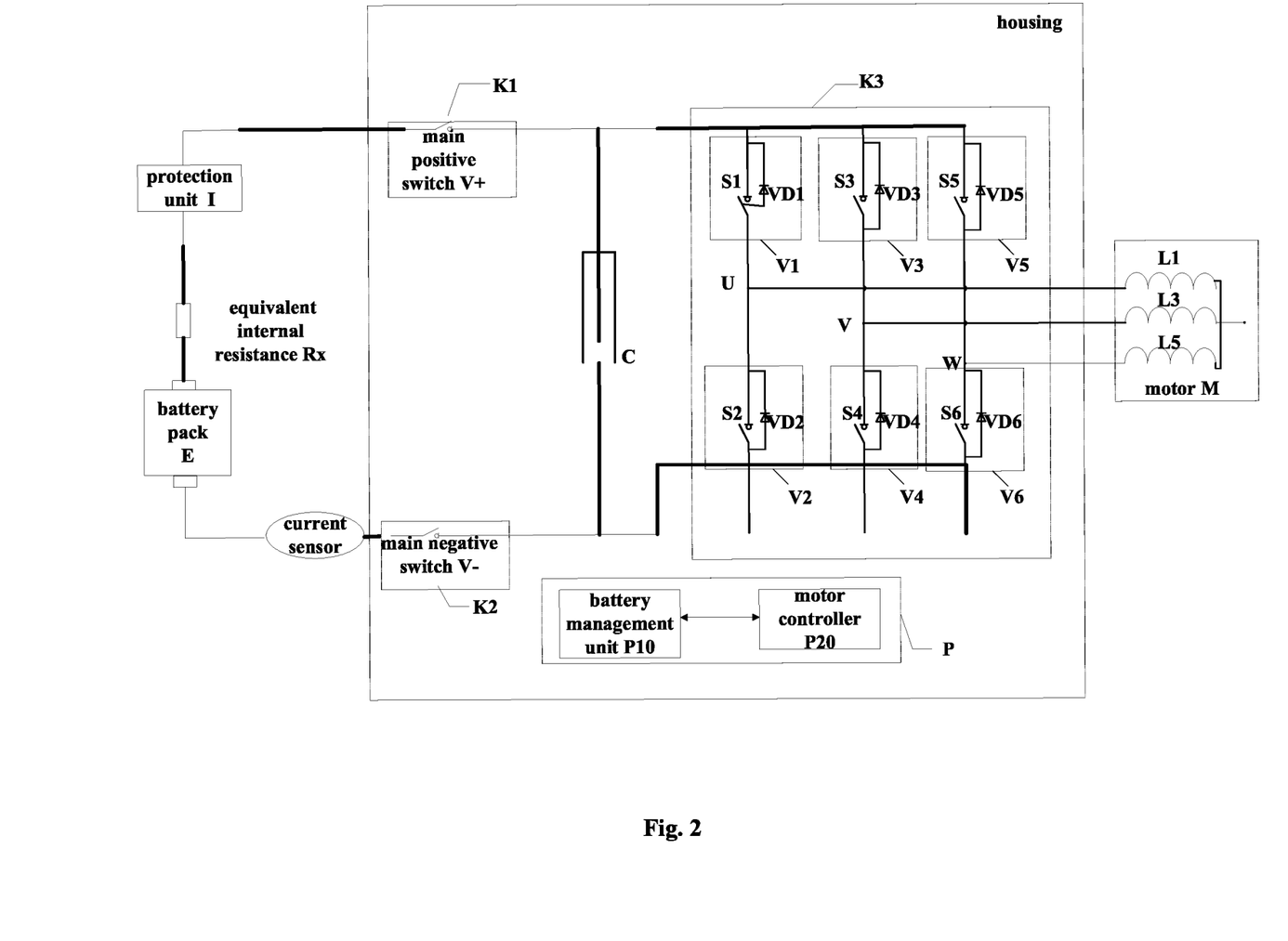
FIG. 2 illustrates a structure diagram of a battery heating system according to some other embodiments of the present disclosure.

FIG. 2 illustrates a battery heating system according to some other embodiments of the present disclosure. FIG. 2 shows a specific structure of the switch component K3 and the motor M of FIG. 1.

As an example, the first switch K1 is a main positive switch V+ connected to the positive electrode of the battery pack E, and the second switch K2 is a main negative switch V− connected to the negative electrode of the battery pack E.

The switch component K3 may include a first phase bridge arm, a second phase bridge arm, and a third phase bridge arm that are connected in parallel. The first phase bridge arm, the second phase bridge arm and the third phase bridge arm each may have an upper bridge arm and a lower bridge arm. Each upper bridge arm may be provided with a switch unit, and each lower bridge arm may also be provided with a switch unit.

For example, as shown in FIG. 2, the first phase bridge arm is a U-phase bridge arm, the second phase bridge arm is a V-phase bridge arm, and the third phase bridge arm is a W-phase bridge arm. The switch unit of the upper bridge arm of the U-phase bridge arm is a first switch unit V1, and the lower bridge arm of the U-phase bridge arm is provided with a second switch unit V2. The switch unit of the upper bridge arm of the V-phase bridge arm is a third switch unit V3, and the switch unit of the lower bridge arm of the V-phase bridge arm is a fourth switch unit V4. The switch unit of the upper bridge arm of the W-phase bridge arm is a fifth switch unit V5, and the switch unit of the lower bridge arm of the W-phase bridge arm is a sixth switch unit V6.

In some examples, the switch units may include one or more of power switches such as an Insulated Gate Bipolar Transistor (IGBT) chip, an IGBT unit, a Metal-Oxide-Semiconductor Field-Effect Transistor (MOSFET), or the like. Herein, the combination and connection manner of IGBT, MOSFET, and the like in the switch unit are not limited. The material of the above power switches is also not limited. For example, a power switch made of silicon carbide (SiC) or other materials may be used.

Each of the switch units may have a corresponding parasitic diode. The parasitic diodes corresponding to the first switch unit V1, the second switch unit V2, the third switch unit V3, the fourth switch unit V4, the fifth switch unit V5, and the sixth switch unit V6 are respectively parasitic diode VD1, parasitic diode VD2, parasitic diode VD3, parasitic diode VD4, parasitic diode VD5 and parasitic diode VD6.

As an example, the diode of each switch unit may be a normal power silicon (Si) diode or a SiC diode. The material of the parasitic diode(s) is not limited in the embodiments of the present disclosure.

In an embodiment of the present disclosure, a first phase input end, a second phase input end and a third phase input end of the motor M may be respectively connected to a connection point between the upper bridge arm and the lower bridge arm of the first phase bridge arm, a connection point between the upper bridge arm and the lower bridge arm of the second phase bridge arm, and a connection point between the upper bridge arm and the lower bridge arm of the third phase bridge arm.

As an example, referring to FIG. 2, a stator of the motor M is equivalent to a three-phase stator inductance, that is, a stator inductance L1, a stator inductance L3 and a stator inductance L5. Each stator inductance may be connected to a phase bridge arm. The stator inductance may store and release energy. One end of the stator inductance L1, one end of the stator inductance L3 and one end of the stator inductance L5 are connected at a common end.

The non-common end of the stator inductance L1 is the first phase input end, the non-common end of the stator inductance L3 is the second phase input end, and the non-common end of the stator inductance L5 is the third phase input end.

It is noted that the first phase input end, the second phase input end and the third phase input end of the motor M may be used as an input end to input current, and may also be used as an output end to output current.

In some examples, the main positive switch V+, the main negative switch V−, the first switch unit V1, the second switch unit V2, the third switch unit V3, the fourth switch unit V4, the fifth switch unit V5, and the sixth switch unit The V6 may be packaged into an entire unit by Si or SiC wafers and disposed in the above housing.

It should be noted that the main controller P may be connected to each of the switch units in the switch component K3. The connection relationship is not shown in FIG. 2.

In some examples, the main controller P may be configured to provide a driving signal to a switch unit of a target upper bridge arm and a switch unit of a target lower bridge arm so as to control the switch unit of the target upper bridge arm and the switch unit of the target lower bridge arm to be periodically turned on and turned off.

The driving signal may specifically be a pulse signal. Further, the driving signal may be a Pulse Width Modulation (PWM) signal. In some examples, a high level in the driving signal may drive the switch unit to be turned on, and a low level signal in the driving signal may drive the switch unit to be turned off. The driving signal may control the switch unit of the target upper bridge arm and the switch unit of the target lower bridge arm to be periodically turned on and turned off.

The switch unit of the target upper bridge arm is a switch unit of an upper bridge arm located in any one of the first phase bridge arm, the second phase bridge arm and the third phase bridge arm, and the switch unit of the target lower bridge arm is a switch unit of a lower bridge arm located in at least one of the first phase bridge arm, the second phase bridge arm and the third phase bridge arm other than the one where the switch unit of the target upper bridge arm is located.

It should be noted that the switch unit(s) that is not driven by the driving signal (i.e., the switch unit(s) except the switch unit of the target upper bridge arm and the switch unit of the target lower bridge arm) is turned off.

For example, if the switch unit of the target upper bridge arm is the first switch unit V1, the switch unit of the target lower bridge arm is the fourth switch unit V4 and/or the sixth switch unit V6, and so on, which will not be enumerated herein.

It should be noted that during each cycle of the periodic turn-on and turn-off, the switch unit of the target upper bridge arm and the switch unit of the target lower bridge arm may be the same or different, which is not limited herein. For example, in each cycle, the driving signal may drive the first switch unit V1 and the fourth switch unit V4 to be turned on and off. For another example, in a first cycle, the driving signal may drive the first switch unit V1 and the fourth switch unit V4 to be turned on and off; in a second cycle, the driving signal may drive the third switch unit V3 and the second switch unit V2 to be turned on and off; and in a third cycle, the driving signal may drive the first switch unit V1, the fourth switch unit V4, and the sixth switch unit V6 to be turned on and off. That is, the switch unit of the target upper bridge arm and the switch unit of the target lower bridge arm driven by the driving signal may be different in different cycles.

The driving signal may drive the switch unit of the target upper bridge arm and the switch unit of the target lower bridge arm to be periodically turned on and off, so that an alternating current may be generated in a circuit formed by the battery pack E, the main positive switch V+, the switch unit of the target upper bridge arm, the motor M, and the switch unit of the target lower bridge arm and the main negative switch V−. Specifically, an alternating sinusoidal current can be generated. That is, the battery pack E may be charged and discharged alternately. During the alternate charging and discharging of the battery pack E, the battery pack E may generate heat, that is, the battery pack E may generate heat from the inside. In this way, the battery pack E can be heated.

It should be noted that the battery heating system may be installed in electric equipment. For example, the battery heating system may be installed in an electric vehicle. When the vehicle is in an operating state such as braking when running, the main controller P may drive the six switch units V1 to V6 in the three-phase voltage-type inverter circuit to be alternately turned on in order to generate an alternating sinusoidal current on the motor M so as to drive the motor M to operate normally. When both of the motor M and the switch component K3 are operating normally, the main controller P may not control the switch units in respective bridge arms of the switch component K3.

Therefore, in the embodiments of the present disclosure, the main controller P may send a driving signal to the switch component K3 when it is determined that both of the motor M and the switch component K3 are in a non-operating state, that is, when the vehicle is in the static state.

In some embodiments, when the main controller P determines that the battery pack E needs to be heated based on the determination of the state parameter of the battery pack E, a battery heating request is sent to the vehicle controller. The main controller P is connected to the battery pack E for acquiring the state parameter of the battery pack E.

In some examples, a temperature sensor and a State of Charge (SOC) acquisition unit may be disposed within the battery pack E. The main controller P may acquire the temperature of the battery pack E and SOC of the battery pack E from the temperature sensor and the SOC acquisition unit. Herein, the temperature of the battery pack E may specifically be the temperature of the shell of the battery pack E, the temperature of the air in the inner space of the battery pack E, the temperature of any one of the battery packs E or a battery cell of the battery pack E, or an average value of the temperatures of all the battery packs E or the battery cells of the battery pack E and the like. The present disclosure is not limited in this respect.

The main controller P may be configured to send the battery heating request to the vehicle controller when the temperature of the battery pack E satisfies a first preset condition and the SOC of the battery pack E satisfies a second preset condition.

The first preset condition may be that the temperature of the battery pack is lower than a preset minimum temperature threshold at which the battery pack E can operate normally, or the temperature of the battery pack is out of a preset temperature range where the battery pack E can operate normally. The second preset condition may be a preset minimum SOC threshold for the SOC of the battery pack, or the SOC of the battery pack is out of a preset SOC range.

The first preset condition and the second preset condition may be set according to the work scenarios and the work requirements, which are not limited herein.

As a specific example, when the temperature of the battery pack E is lower than a first preset temperature threshold and the SOC of the battery pack E is higher than the preset SOC threshold, the main controller P may determine that the battery pack E needs to be heated.

When the vehicle controller receives the battery heating request, it is determined whether the vehicle in which the battery pack E is located is in the static state and whether the switch component K3 and the motor M are in operation. If the vehicle controller determines that the vehicle is in the static state and neither the switch component K3 nor the motor M is operating, a battery heating instruction is sent to the main controller P. After receiving the battery heating instruction, the main controller P may control the main positive switch V+ and the main negative switch V− to be closed, and provide a driving signal to the switch component K3 so as to control the switch component K3 to be periodically turned on and off. In this way, the alternating current may be generated in the battery heating system to heat the battery pack E.

The main controller P may provide the driving signal to the switch component K3 after both of the main positive switch V+ and the main negative switch V− are closed. As an example, the main controller P may first control the second switch K2 to be closed, and then control the main positive switch V+ to be closed.

In FIG. 2, the resistance between the battery pack E and the main positive switch V+ is an equivalent internal resistance Rx of the battery pack E. The internal resistance of the battery pack E may increase at a lower temperature. For example, the internal resistance of a power lithium battery at −25° C. is 5 to 15 times the internal resistance of the power lithium battery at 25° C. During alternate charging and discharging of the battery pack E, the generated heat is larger and the heating speed is faster.

In some examples, referring to FIG. 2, each of the switch units in FIG. 2 may include a power switch. The first switch unit V1 may include a first power switch S1, the second switch unit V2 may include a second power switch S2, the third switch unit V3 may include a third power switch S3, and the fourth switch unit V4 may include a fourth power switch S4, the fifth switch unit V5 may include a fifth power switch S5, and the sixth switch unit V6 may include a sixth power switch S6. The parasitic diode of the first power switch S1 is VD1, the parasitic diode of the second power switch S2 is VD2, the parasitic diode of the third power switch S3 is VD3, and the parasitic diode of the fourth power switch S4 is VD4. The parasitic diode of the fifth power switch S5 is VD5, and the parasitic diode of the sixth power switch S6 is VD6.

The anode of the parasitic diode of the switch unit of the upper bridge arm is connected with the connection point between the upper bridge arm and the lower bridge arm; the cathode of the parasitic diode of the switch unit of the upper bridge arm is connected with the end of the upper bridge arm where the upper bridge arm is connected to the main positive switch V+. The anode of the parasitic diode of the switch unit of the lower bridge arm is connected to the end of the lower bridge arm where the lower bridge arm is connected to the main negative switch V−; the cathode of the parasitic diode of the switch unit of the lower bridge arm is connected with the connection point between the upper bridge arm and the lower bridge arm.

In some embodiments of the disclosure, the battery heating system may further include a capacitor C connected in parallel with the switch component K3. For example, the capacitor C may be a Dc-link capacitor. The capacitor may be connected in parallel with the first phase bridge arm. Similarly, the capacitor may be connected in parallel with both of the second phase bridge arm and the third phase bridge arm. One end of the capacitor may be connected to one end of the first phase bridge arm where the first phase bridge arm is connected to the main positive switch V+, and the other end of the capacitor may be connected to one end of the first phase bridge arm where the first phase bridge arm is connected to the main negative switch V−. The Dc-link capacitor may be used to avoid the influence of voltage overshoot and transient overvoltage generated during state switching by the switch unit in the switching component K3 on the switch unit in the three-phase full-bridge inverter circuit, and stabilize the voltage on the direct current bus so as to make the voltage fluctuation remain within an allowable range.

In an embodiment of the present disclosure, the main positive switch V+, the main negative switch V−, the switch component K3, the main controller P and the capacitor may be integrated in the same housing. As a result, the number of wire harnesses and the length of the wire harness can be reduced and a parasitic parameter(s) for the wire harness is better optimized. As an example, the requirements in a design parameter(s) for the Dc-link capacitor may be reduced.

In some embodiments of the present disclosure, referring to FIG. 2, the battery heating system may further include a current sensor disposed between the negative electrode of the battery pack E and the main negative switch V− for collecting the heating current of the battery pack E. The main controller P may determine whether the battery heating system is in a normal operation mode by using the heating current flowing through the current sensor. As an example, if the heating current of the battery pack E reaches a preset current threshold, it may be determined that the battery heating system is not in the normal operation mode, that is, in an abnormal operation mode.

In some embodiments of the disclosure, referring to FIG. 2, the battery heating system may further include a protection unit I disposed between the negative electrode of the battery pack E and the main positive switch V+. As an example, the protection unit I may be a Manual Service Disconnect (MSD). As a specific example, when the battery heating system is in an abnormal operation mode, the high voltage circuit may be quickly cut off by the MSD to ensure the safety of the battery pack E.

As another example, the protection unit I may also be a fuse. When the heating current of the battery pack E reaches a threshold corresponding to the fuse, the fuse will be quickly blown to cut off the circuit and improve the safety of battery heating.

As shown in FIG. 2, after the main controller supplies a driving signal to the switch unit of the target upper bridge arm and the switch unit of the target lower bridge arm, if the switch unit of the target upper bridge arm and the switch unit of the target lower bridge arm are driven to be turned on by the driving signal, a discharge circuit for the battery pack E is formed. The current direction is the battery pack E→the protection unit I→the main positive switch V+→the switch unit of the target upper bridge arm→the stator inductance corresponding to the switch unit of the target upper bridge arm→the stator inductance corresponding to the switch unit of the target lower bridge arm→the switch unit of the target lower bridge arm→k the main negative switch V-→the current sensor→the battery pack E.

If the switch unit of the target upper bridge arm and the switch unit of the target lower bridge arm are driven to be turned off by the driving signal, the stator inductance may release energy due to the energy storage function of the stator inductance, and thus a charging circuit for the battery pack E may be formed. The current direction is the stator inductance corresponding to the switch unit of the target upper bridge arm→the parasitic diode of the switch unit of the target upper bridge arm the main positive switch V+→the protection unit I→the battery pack E→the current sensor→the main negative switch V-→the parasitic diode of the switch unit of the target lower bridge arm→the stator inductance corresponding to the switch unit of the target lower bridge arm.

In some examples, the frequency of the driving signal may range from 100 Hz to 100,000 Hz. The frequency of the driving signal is the switching frequency of the switch units. The duty ratio of the driving signal ranges from 5% to 50%. The duty ratio of the driving signal is the ratio of the turn-on time to the sum of the turn-on time and the turn-off time of the switch unit(s).

Since the switch unit of the target upper bridge arm and the switch unit of the target lower bridge arm are selected differently, the transmission circuits for the alternating current are also different. The battery heating system shown in FIG. 2 will be taken as an example to illustrate the transmission circuit and current direction of the alternating current generated in the battery heating system.

In a first mode, the switch unit of the target upper bridge arm includes the switch unit of the upper bridge arm of the first phase bridge arm, and the switch unit of the target lower bridge arm includes the switch unit of the lower bridge arm of the second phase bridge arm.

In the first mode, the main controller P may transmit a driving signal to the first power switch S1 and the fourth power switch S4 to drive the first power switch S1 and the fourth power switch S4 to be turned on. The battery pack E is discharged to form a discharge circuit of the battery pack E. The current direction is the battery pack E→the protection unit I→the main positive switch V+→the first power switch S1→the stator inductance L1→the stator inductance L3→the fourth power switch S4→the main negative switch V-→the current sensor→the battery pack E.

The driving signal sent by the main controller P to the first power switch S1 and the fourth power switch S4 may drives the first power switch S1 and the fourth power switch S4 to be turned off, and the stator inductor L1 and the stator inductor L3 to release energy, so that the battery pack E is charged. In this way, the charging circuit of the battery pack E may be formed. The current direction is the stator inductance L1→the parasitic diode VD1 of the first power switch S1→the main positive switch V+→the protection unit I→the battery pack E→the current sensor→the main negative switch V-→the parasitic diode VD4 of the fourth power switch S4→the stator inductance L3.

In a second mode, the switch unit of the target upper bridge arm includes the switch unit of the upper bridge arm of the first phase bridge arm, and the switch unit of the target lower bridge arm includes the switch unit of the lower bridge arm of the second phase bridge arm and the switch unit of the lower bridge arm of the third phase bridge arm.

In the second mode, the main controller P sends a driving signal to the first power switch S1, the fourth power switch S4 and the sixth power switch S6 to drive the first power switch S1 and the fourth power switch S4 and the sixth power switch S6 to be turned on. The battery pack E is discharged to form the discharge circuit of the battery pack E. The current direction is the battery pack E→the protection unit I→the main positive switch V+→the first power switch S1→the stator inductance L1→the stator inductance L2 and the stator inductance L3→the fourth power switch S4 and the sixth power switch S6→the main negative switch V-→the current sensor→the battery pack E. After the stator inductance L2 and the stator inductance L3 are connected in parallel, they are connected in series with the stator inductance L1.

The driving signal sent by the main controller P to the first power switch S1, the fourth power switch S4 and the sixth power switch S6 may drive the first power switch S1, the fourth power switch S4 and the sixth power switch. S6 to be turned off. The stator inductance L1, the stator inductance L2 and the stator inductance L3 may release energy and the battery pack E is charged to form the charging circuit of the battery pack E. The current direction is the stator inductance L1→the parasitic diode VD1 of the first power switch S1→the main positive switch V+→the protection unit I→the battery pack E→the current sensor→the main negative switch V-→the parasitic diode VD4 of the fourth power switch S4 and the parasitic diode VD6 of the sixth power switch S6→the stator inductance L2 and the stator inductance L3.

In the similar way, a plurality of heating modes may be generated by selecting different switch unit(s) of the target upper bridge arm(s) and switch unit(s) of the target lower bridge arm(s), which are not exhaustive herein. The battery pack E may be charged and discharged quickly by controlling the change of the control timing among the power switches, so that the battery pack E may be heated. It should be noted that, in each of the above heating modes, the switch unit(s) of the non-target upper bridge arm(s) and the switch unit(s) of the non-target lower bridge arm(s) are turned off.

In an embodiment of the disclosure, the magnitude of the alternating current generated by driving of each of the switch units in the switch component K3 through the driving signal drive may be related to the frequency and duty ratio of the driving signal. The larger the magnitude of the alternating current, the more heat is generated by the battery pack E. As the temperature of the battery pack E increases, the impedance of the battery pack E gradually decreases, and thus the heating current flowing through the battery pack E gradually increases. When the main controller P detects that the heating current is increasing, the main controller P, in the heating of the battery pack, may derive a desired frequency and a desired duty ratio based on the state parameter of the battery pack E, and provide the switch component K3 with a driving signal having the desired frequency and the desired duty ratio, in order to prevent the devices in the circuit from being burnt out due to the excessively large heating current in the circuit and also to stabilize the heating speed of the battery pack E.

In some specific examples, the main controller P may derive the desired duty ratio and desired frequency of the driving signal based on the acquired state parameter of the battery pack E and a proportional-integral-derivative (PID) algorithm. The main controller P may adjust an original frequency and an original duty ratio of the driving signal to the above desired frequency and desired duty ratio, and then control the turn-on period and turn-off period of the switch unit of the target upper bridge arm and the switch unit of the target lower bridge arm by using the driving signal having the desired frequency and the desired duty ratio. In this way, the magnitude of heating current can be controlled in real time. Specifically, the main controller P may utilize the PID control algorithm to dynamically increase the frequency of the driving signal and/or reduce the duty ratio of the driving signal to control the heating current. The state parameter of the battery pack E may be any one of parameters such as heating current, temperature, SOC, voltage and the like.

In some examples, during the heating of the battery pack, the main controller P may also utilize a preset correspondence between the state parameter(s) of the battery pack and the duty ratio, a preset correspondence between the state parameter(s) of the battery pack and the frequency, and the obtained current state parameter(s) of the battery pack E, to obtain the desired duty ratio and the desired frequency corresponding to the current state parameter(s). In this way, dynamically querying of the desired frequency and the desired duty ratio corresponding to the state parameter(s) of the battery pack E can be achieved during the heating. The preset correspondence between the state parameter(s) of the battery pack and the duty ratio may be a correspondence between at least one state parameter and the duty ratio, and the preset correspondence between the state parameter(s) of the battery pack and the frequency may also be a correspondence between at least one state parameter and the duty ratio.

In some embodiments of the disclosure, the battery heating system may further include a water cooling subsystem (not shown). The motor M may transfer the heat generated by itself to the battery pack E through the water cooling subsystem; and/or, the switch component K3 may transfer the heat generated by itself to the battery pack E through the water cooling subsystem.

As an example, when the motor M and the switch component K3 are in a normal operating state, heat may be generated around the motor M and around the switch component K3. The water cooling subsystem may collect the temperature of the motor M and the temperature of the battery pack E, and determine whether the value of the temperature of the motor M subtracted by the temperature of the battery pack E exceeds a second preset temperature threshold. When the value of the temperature of the motor M subtracted by the temperature of the battery pack E exceeds the second preset temperature threshold, the water cooling subsystem may be turned on to transfer the heat generated by the motor M to the battery pack E to externally heat the battery pack E. The temperature of the motor M may be the ambient temperature around the motor M.

As an example, the water cooling subsystem may collect the temperature of the switch component K3 and the temperature of the battery pack E, and determine whether the value of the temperature of the switch component K3 subtracted by the temperature of the battery pack E exceeds a third preset temperature threshold. When the value of the temperature of the switch component K3 subtracted by the temperature of the battery pack E exceeds the third preset temperature threshold, the water-cooling subsystem is turned on to transfer the heat generated by the switch component K3 to the battery pack E so as to externally heat the battery pack E. The heat generated by the switch component K3 may be heat generated by at least one switch unit of the switch components K3. The temperature of the switch component K3 may be an ambient temperature around the switch component K3, an average value of the ambient temperatures of all the switch units in the switch component K3, or an ambient temperature of a certain switch unit, and the like, which is not limited herein.

In some examples, when the value of the temperature of the motor M subtracted by the temperature of the battery pack E exceeds the second preset temperature threshold, and the value of the temperature of the switch component K3 subtracted by the temperature of the battery pack E exceeds the third preset temperature threshold, both the motor M and the switch component K3 may transfer heat to the battery pack E through the water-cooling subsystem so as to externally heat the battery pack E.

Integrated heating of the battery pack E may be achieved by the external heating of the battery pack E through the water-cooling subsystem and the internal heating described above. As a result, the heating efficiency of the battery pack E can be improved.

With reference to FIG. 2, in some embodiments of the disclosure, the main controller P may include a battery management unit P10 and a motor controller P20. The battery management unit P10 may be connected to the battery pack E (the connection relationship is not shown) for acquiring the state parameter of the battery pack E. The motor controller P20 may be connected to each of the switch units for providing a driving signal for each of the switch units to control the turn-on and turn-off of each of the switch units.

The battery management unit P10 may be configured to determine whether the battery pack E needs to be heated based on the collected state parameter of the battery pack E, and to send a battery heating request to the vehicle controller when it is determined that the battery pack E needs to be heated. The vehicle controller may send, according to the battery heating request, a battery heating instruction to the motor controller P20 in the case where it is determined that the vehicle is in a static state and the motor M is not operating.

The determination of whether the battery pack E needs to be heated by the battery management unit P10 is similar to the determination of whether the battery pack E needs to be heated by the main controller P, and details are not described herein again.

The motor controller P20 may be configured to establish communication with the battery management unit P10 after receiving the battery heating instruction. The battery management unit P10 may further be configured to control both of the first switch K1 and the second switch K2 to be closed, and to send switch closing information to the motor controller P20 after the first switch K1 and the second switch K2 are both closed. The motor controller P20 may be further configured to control, after receiving the switch closure information, the switch component K3 so as to heat the battery pack E. The switch closure information may include closing information for the first switch K1 and closing information for the second switch K2.

In some examples, the motor controller P20 may be configured to provide a driving signal to the switch unit(s) in the switch component K3 to periodically turn the switch component K3 on or off, so that an alternating excitation current can be generated continuously in the high voltage circuit where the battery pack E is located. The alternating excitation current flows continuously through the battery pack E to cause the internal resistance of the battery pack E to generate heat. In this way, the battery pack can be heated from the inside, therefore the heating efficiency can be improved.

Referring to FIG. 2, the motor controller P20 may be connected to each of the switch units (the connection relationship is not shown) for controlling the turn-on and turn-off of the switch units. The motor controller P20 may be configured to provide a driving signal for the switch unit of the target upper bridge arm and the switch unit of the target lower bridge arm to control the switch unit of the target upper bridge arm and the switch unit of the target lower bridge arm to be periodically turned on and off.

The controlling of the periodical turn-on and turn-off of the switch unit of the target upper bridge arm and the switch unit of the target lower bridge arm by the motor M may be similar with the controlling of the periodical turn-on and turn-off of the switch unit of the target upper bridge arm and the switch unit of the target lower bridge arm by the main controller P, as detailed in the above embodiments.

When the vehicle is in the static state, with the cooperation of the battery management unit P10 and the motor controller P20, an alternating excitation current can be generated in the high voltage circuit to flow through the battery pack E so as to heat the battery pack E from the inside.

In the heating of the battery pack E using the battery management unit P10 and the motor controller P20, similarly, the battery management unit P10 may also obtain the desired duty ratio and the desired frequency based on the current collected by the current sensor and the PID algorithm, and send the desired duty ratio and the desired frequency to the motor controller P20. After obtaining the desired duty ratio and the desired frequency, the motor controller P20 may adjust the original frequency and the original duty ratio of the driving signal to the desired frequency and the desired duty ratio, and then the motor controller P20 may utilize the driving signal having the desired frequency and the desired duty ratio to control the switch component K3, so that the magnitude of the heating current may be controlled in real time.

In the embodiments of the present disclosure, the battery management unit P10 and the motor controller P20 may be designed in a separate or a centralized fashion. There may be various communication modes between them, for example, a common controller area network (CAN) system or car Ethernet system.

Figure 3:
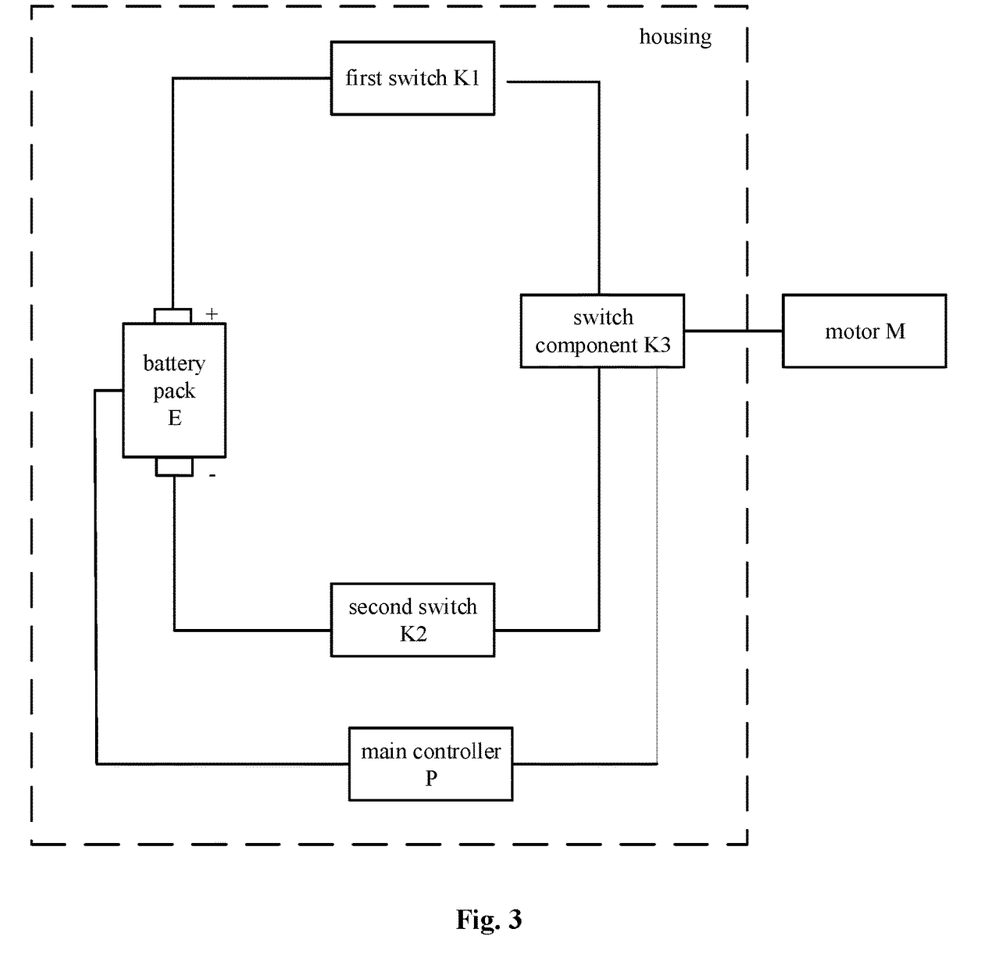
FIG. 3 illustrates a structure diagram of a battery heating system according to yet some others embodiments of the present disclosure.

In some embodiments of the present disclosure, as shown in FIG. 3, the battery pack E, the first switch K1, the second switch K2, the switch component K3 and the main controller P may be integrated in the same housing, for example, integrated in a battery package. With the integration of the battery pack E, the first switch K1, the second switch K2, the switch component K3 and the main controller P, the structure may be simple, the manufacturing may also be easy, and thus the cost may be reduced.

Figure 4:
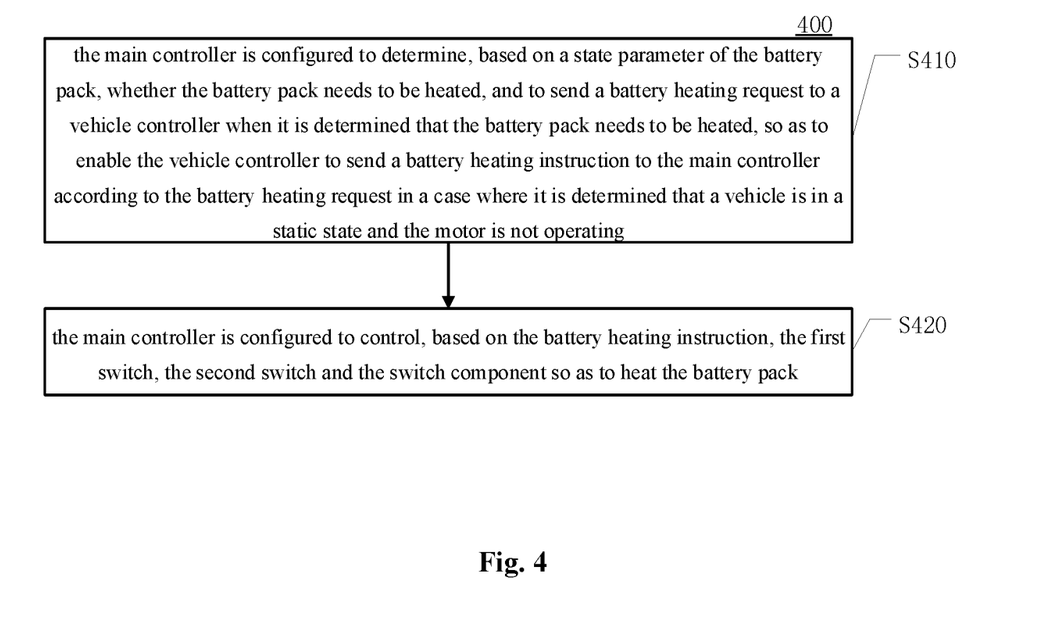
FIG. 4 illustrates a schematic flow chart of a method for controlling a battery heating system according to some embodiments of the present disclosure.

A method of controlling the battery heating system will be described in detail below with reference to FIG. 4 and FIG. 2. FIG. 4 illustrates a schematic flow chart of a method for controlling a battery heating system according to some embodiments of the present disclosure. The method may include the following steps.

In step S410, the main controller P determines, based on the state parameter of the battery pack E, whether the battery pack E needs to be heated, and sends a battery heating request to the vehicle controller when it is determined that the battery pack E needs to be heated, so as to enable the vehicle controller to send, according to the battery heating request, a battery heating instruction to the main controller P in a case where it is determined that the vehicle is in a static state and the motor M is not operating.

In step S420, the main controller P controls, based on the battery heating instruction, the first switch K1, the second switch K2 and the switch component K3 so as to heat the battery pack E.

In step S410, if the main controller P determines that the temperature of the battery pack E satisfies the first preset condition and the SOC of the battery pack E satisfies the second preset condition, the main controller P determines that the battery pack E needs to be heated.

In step S420, the main controller P controls both of the first switch K1 and the second switch K2 to be closed according to the battery heating instruction, and provides a driving signal to the switch component K3 to control the switch component K3 to be periodically turned on and turned off, so as to enable heating of the battery pack E.

When the main controller P receives a first heating instruction, it may send, on the basis that both of the first switch K1 and the second switch K2 are closed, the driving signal to the switch component K3 according to a preset control strategy, so as to perform driving control to the switch component K3.

Other related description of the step S410 and the step S420 may refer to the description in the above embodiments, and thus details are not described here again.

In some embodiments of the present disclosure, during the heating of the battery pack E, the main controller P may collect the temperature of the battery pack E, the voltage of the battery pack E and the SOC of the battery pack E; also, the main controller P may obtain the heating current collected by the current sensor and the temperature of the switch component K3 collected by the temperature sensor in real time.

The temperature of the switch component K3 may be an ambient temperature at a specified position near the switch component K3, or an ambient temperature near any switch unit, or the average of ambient temperatures of the six switch units, etc. The disclosure is not limited in this respect.

Then, the main controller P may determine in real time whether the battery heating system is in the normal operation mode based on at least one of the temperature of the battery pack E, the voltage of the battery pack E, the SOC of the battery pack E, the heating current collected by the current sensor, and the temperature of the switch component K3 that are collected or obtained in real time.

As an example, the main controller P may determine that the battery heating system is in an abnormal operation mode when one or more of the following conditions are satisfied: the temperature of the battery pack E is higher than the preset temperature threshold, the voltage of the battery pack E is lower than the preset voltage threshold, the SOC of the battery pack E is higher than the preset SOC threshold, the heating current is higher than the preset current threshold, and the temperature of the switch component K3 is higher the preset temperature threshold.

As an example, when whether the battery heating system is in the normal operation mode is determined based on one of the above five parameters, if the parameter does not reach the corresponding preset threshold, the main controller P determines that the battery heating system is in the normal operation mode; and if the parameter reaches the corresponding preset threshold, the main controller P determines that the battery heating system is not in the normal operation mode.

When whether the battery heating system is in the normal operation mode is determined based on two or more of the above five parameters, if one or more parameters reach the preset threshold corresponding to each of the parameters, the main controller P determines the battery heating system is not in the normal operation mode; and if all the parameters do not reach the respective thresholds, the main controller P determines that the battery heating system is in the normal operation mode.

In an embodiment of the present disclosure, if the main controller P determines that the battery heating system is not in the normal operation mode, the main controller P may stop transmitting the driving signal to the switch component K3, that is, the main controller P may control the switch component K3 to be turned off and turn off the first switch K1 and the second switch K2, to ensure the safety of the battery pack E, and the vehicle controller may be informed of abnormality of the battery heating system. The main controller P may stop sending the driving signal to the switch component K3, that is, the main controller P may control all the switches in the switch component K3 to be turned off.

If the main controller P determines that the battery heating system is in the normal operation mode, it may determine whether the temperature of the battery pack E reaches the preset heating temperature.

When the main controller P determines that the temperature of the battery pack E reaches the preset heating temperature, the main controller P controls the switch component K3 to be turned off. At the same time, the main controller P may turn off the first switch K1 and the second switch K2 to cut off the heating circuit. The main controller P may send information about completion of the heating to the vehicle controller. When the main controller P determines that the temperature of the battery pack E does not reach the preset heating temperature, the main controller P may continue to output a driving signal so as to heat the battery pack E.

With both of the main controller P and the vehicle controller, not only rapid heating of the battery pack E is achieved, but also the heating procedure of the battery pack can be realized by the vehicle controller.

In some embodiments of the present disclosure, the main controller P includes a battery management unit P10 and a motor controller P20, referring to FIG. 2. In this case, in step S410, the battery management unit P10 may be configured to determine, based on the state parameter of the battery pack E, whether the battery pack E needs to be heated, and to send the battery heating request to the vehicle controller when it is determined that the battery pack E needs to be heated, so as to enable the vehicle controller to send the battery heating instruction to the motor controller P20 according to the battery heating request in the case where it is determined that the vehicle is in the static state and the motor M is not operating.

Figure 5:
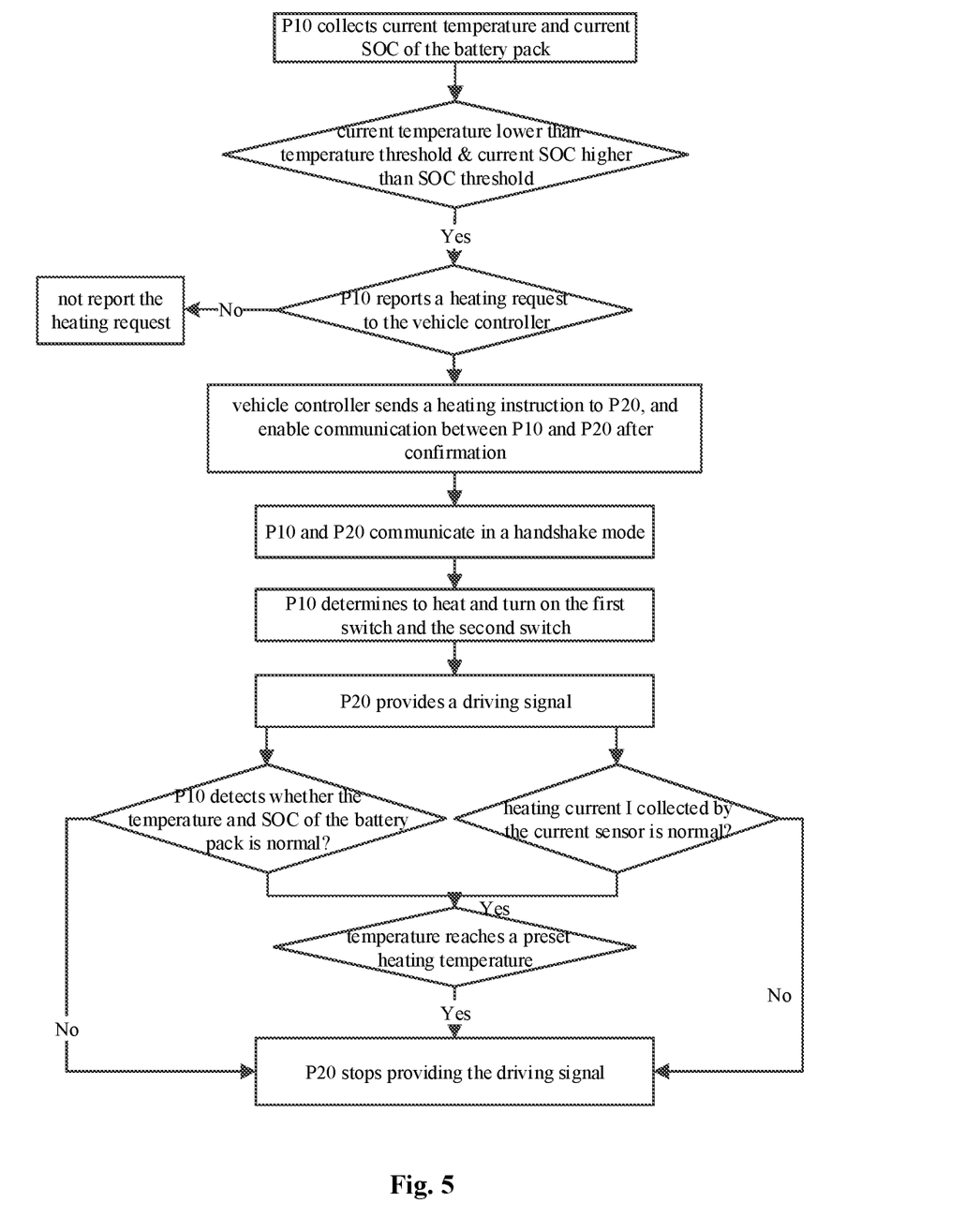
FIG. 5 illustrates a schematic flow chart of a method for controlling a battery heating system according to some other embodiments of the present disclosure.

Specifically, referring to FIG. 5, the battery management unit P10 may be configured to collect, when the vehicle is in the static state, the temperature and SOC of the current battery pack E, and determine whether the battery pack E needs to be heated according to the temperature and the SOC of the current battery pack E.

If the current temperature of the battery pack E is lower than the preset temperature threshold and the current SOC of the battery pack E is higher than the preset SOC threshold, the battery heating request is uploaded to the vehicle controller. If the battery management unit P10 determines that the battery pack E does not need to be heated, there is no need to report the battery heating request to the vehicle controller.

The vehicle controller may be configured to detect the current state of the vehicle and send, when the vehicle controller determines that the motor M is not operating and the vehicle is in the static state, the battery heating instruction to the motor controller P20.

In step S420, the motor controller P20 may establish communication with the battery management unit P10 after receiving the battery heating instruction; the battery management unit P10 may control both the first switch K1 and the second switch K2 to be closed, and send, after both of the first switch K1 and the second switch K2 are closed, the switch closing information to the motor controller P20; the motor controller P20 may be further to control, after receiving the switch closing information, the switch component K3 so as to heat the battery pack E.

As an example, with reference to FIG. 5, after receiving the battery heating instruction, the motor controller P20 may send a communication establishment request to the vehicle controller to directly establish communication with the battery management unit P10, to cause the vehicle controller to enable communication between the motor controller P20 and the battery management unit P10 according to the communication establishment request.

The vehicle controller may be configured to make, after the vehicle controller makes a confirmation, a communication channel available between the motor controller P20 and the battery management unit P10.

After the vehicle controller makes the communication channel available between the motor controller P20 and the battery management unit P10, the motor controller P20 and the battery management unit P10 may first perform communication in a handshake mode to determine whether normal communication can be performed between the both parties.

In some embodiments, referring to FIG. 5, after normal communication can be performed between the motor controller P20 and the battery management unit P10, the battery management unit P10 may re-acquire the state parameter of the battery pack E and re-determine whether the battery pack E needs to be heated. The specific determination method is similar to the determination of whether the battery pack E needs to be heated for the first time, and details are not described here again.

When the battery management unit P10 re-confirms that the battery pack E needs to be heated, the battery management unit P10 may send a heating instruction to the motor controller P20. When the motor controller P20 identifies the heating instruction, the operation state of the motor M and the switch component K3 will be re-determined.

When the motor controller P20 determines that the motor M and the switch component K3 are not in non-operation state, information related to operating state of the motor M may be transmitted to the battery management unit P10. Then, the battery management unit P10 may drive the first switch K1 and the second switch K2 to be closed after receiving the information related to operating state of the motor M.

The battery management unit P10 may report the switch closing information to the motor controller P20 to inform the motor controller P20 that a driving signal can be sent to the switch unit of the target upper bridge arm and the switch unit of the target lower bridge arm so as to heat the battery pack E.

When the motor controller P20 receives the switch closing information, it may send, according to a set control strategy, a driving signal to the switch component K3 to perform driving control on the switch component K3.

During the heating of the battery pack E, the battery management unit P10 may collect the temperature of the battery pack E, the voltage value of the battery pack E and the SOC of the battery pack E, and may obtain the battery heating current collected by the battery sensor in real time. The battery management unit P10 may also determine whether the battery heating system is in a normal operation mode according to at least one of these four parameters. The method for the battery management unit P10 to determine whether the battery heating system is in the normal operation mode is similar to the above method in which the main controller P determines whether the battery heating system is in the normal operation mode, and details are not described here again.

As an example, referring to FIG. 5, the battery management unit P10 may determine whether each parameter is normal, that is, whether each parameter reaches a corresponding threshold, based on the temperature of the battery pack E, the SOC of the battery pack E and the battery heating current. Once the battery management unit P10 determines that the battery heating system is not in the normal operation mode, abnormal-state information may be sent to the motor controller P20. The battery management unit P10 may take the highest priority to report the abnormal-state information to the motor controller P20.

When receiving the abnormal-state information, the motor controller P20 may control the switch component K3 to be turned off, that is, the motor controller P20 may stop transmitting the driving signal to the switch component K3, and transmit first state information of the switch component to the battery management unit P10. The first state information of the switch component may include off-state information of all of the switch units in the switch component K3. That is, the motor controller P20 may be required to report the state information of the switch units.

When the battery management unit P10 receives the first state information of the switch component, the first switch K1 and the second switch K2 are turned off to completely cut off the heating circuit.

In some embodiments of the disclosure, the motor controller P20 may also determine whether the battery heating system is in the normal operation mode based on the temperature of the switch component K3. The specific determination method is similar to the one for the main controller P to determine, based on the temperature of the switch component K3, whether the battery heating system is in the normal operation mode, and details are not described here again.

If the motor controller P20 determines that the battery heating system is not in the normal operation mode, it may control the switch component K3 to be turned off and transmits second state information of the switch component to the battery management unit P10.

When receiving the second state information of the switch component, the battery management unit P10 may turn off the first switch K1 and the second switch K2 to completely cut off the heating circuit. The second state information of the switch component may also include the off-state information of all the switch units in the switch component K3.

In an embodiment of the present disclosure, during the heating of the battery pack E, the battery management unit P10 may need to determine in real time whether the current temperature of the battery pack E reaches the preset heating temperature. If the battery management unit P10 determines that the temperature of the battery pack E reaches the preset heating temperature, it may send a stop heating instruction to the motor controller P20. The motor controller P20 may control the switch component K3 to be turned off according to the stop heating instruction, and transmit third state information of the switch component to the battery management unit P10. The battery management unit P10 may turn off the first switch K1 and the second switch K2 when receiving the third state information of the switch component. The third state information of the switch component may include off-state information of all of the switch units in the switch component K3.

As an example, referring to FIG. 5, after the battery management unit P10 determines that the current temperature of the battery pack E has satisfied the set temperature threshold, the battery management unit P10 may report the stop heating instruction to the motor controller P20. After the motor controller P20 identifies the stop heating instruction, it may drive the switch units in the switch component K3 to be turned off, and provide the current state of the switch units to the battery management unit P10. The battery management unit P10 may turn off the first switch K1 and the second switch K2. The battery management unit P10 and the motor controller P20 may disconnect the communication and report it to the vehicle controller when they determine to exit the heating mode.

It is to be understood that the various embodiments in the specification are described in a progressive manner, the same or similar parts among the various embodiments may be referred to each other, and each embodiment focuses on the difference from other embodiments. For the control method embodiments, the relevant parts can be found in the description of the battery heating system embodiments. The disclosure is not limited to the specific steps and structures described above and illustrated in the drawings. A person skilled in the art may make various changes, modifications and additions, or change the order among the steps after realizing the spirit of the disclosure. Also, a detailed description of known method techniques is omitted herein for the sake of brevity.

Those skilled in the art will appreciate that the above embodiments are illustrative and not restrictive. Different technical features that appear in different embodiments can be combined to achieve a beneficial effect. Embodiments with other variations for the disclosed embodiments can be understood and practiced by those skilled in the art after those skilled in the art understand the drawings, the specification and the claims. In the claims, the phrase "comprise" does not exclude other means or steps; the indefinite article "a" or "an" does not exclude more than one; phrases "first" and "second" are used to label items rather than illustrate any particular order. Any reference sign in the claims should not be construed as limiting the scope of the disclosure. The features of various parts in the claims can be implemented by a single hardware or software module. Existence of certain technical features in different dependent claims does not mean that these technical features are not combined to obtain a beneficial effect.

What is claimed is:

1. A battery heating system for heating a battery pack, the system comprising: a first switch connected to a positive electrode of the battery pack, a second switch connected to a negative electrode of the battery pack, a switch component connected between the first switch and the second switch, a motor connected to the switch component, and a main controller; wherein:

the first switch, the second switch, the switch component and the main controller are integrated in a same housing;

the main controller is configured to determine, based on a state parameter of the battery pack, whether the battery pack needs to be heated, and to send a battery heating request to a vehicle controller when it is determined that the battery pack needs to be heated, so as to enable the vehicle controller to send a battery heating instruction to the main controller according to the battery heating request in a case where it is determined that a vehicle is in a static state and the motor is not operating; and the main controller is configured to control, based on the battery heating instruction, the first switch, the second switch and the switch component so as to heat the battery pack.

2. The system of claim 1, wherein the battery pack is integrated in the housing.

3. The system of claim 1, wherein the state parameter comprises a temperature and a state of charge (SOC) of the battery pack; and the main controller is configured to send the battery heating request to the vehicle controller when the temperature of the battery pack satisfies a first preset condition and the SOC of the battery pack satisfies a second preset condition.

4. The system of claim 1, wherein the main controller is configured to control both of the first switch and the second switch to be closed according to the battery heating instruction, and to provide the switch component with a driving signal to control the switch component to be turned on and turned off periodically, so as to enable heating of the battery pack;

wherein, a frequency of the driving signal ranges from 100 Hz to 100000 Hz, and a duty ratio of the driving signal ranges from 5% to 50%.

5. The system of claim 4, wherein the switch component comprises a first phase bridge arm, a second phase bridge arm and a third phase bridge arm which are connected in parallel, each of the first phase bridge arm, the second phase bridge arm and the third phase bridge arm has an upper bridge arm and a lower bridge arm, the upper bridge arm is provided with a switch unit, and the lower bridge arm is provided with a switch unit;

a first phase input end, a second phase input end and a third phase input end of the motor are respectively connected to a connection point between the upper bridge arm and the lower bridge arm of the first phase bridge arm, a connection point between the upper bridge arm and the lower bridge arm of the second phase bridge arm, and a connection point between the upper bridge arm and the lower bridge arm of the third phase bridge arm;

the main controller is configured to provide the driving signal to a switch unit of a target upper bridge arm and a switch unit of a target lower bridge arm so as to control the switch unit of the target upper bridge arm and the switch unit of the target lower bridge arm to be periodically turned on and turned off; and wherein the switch unit of the target upper bridge arm is a switch unit of an upper bridge arm located in any one of the first phase bridge arm, the second phase bridge arm and the third phase bridge arm, and the switch unit of the target lower bridge arm is a switch unit of a lower bridge arm located in at least one of the first phase bridge arm, the second phase bridge arm and the third phase bridge arm other than the one where the switch unit of the target upper bridge arm is located.

6. The system of claim 1, further comprising a protection unit disposed between the positive electrode of the battery pack and the first switch.

7. The system of claim 1, further comprising a current sensor disposed between the negative electrode of the battery pack and the second switch.

8. The system of claim 1, further comprising a water cooling subsystem;

wherein the motor is configured to transfer heat generated by itself to the battery pack through the water cooling subsystem; and/or, the switch component is configured to transfer heat generated by itself to the battery pack through the water cooling subsystem.

9. The system of claim 1, wherein the main controller comprises a battery management unit and a motor controller;

the battery management unit is configured to determine, based on the state parameter of the battery pack, whether the battery pack needs to be heated, and to send the battery heating request to the vehicle controller when it is determined that the battery pack needs to be heated, so as to enable the vehicle controller to send the battery heating instruction to the motor controller according to the battery heating request in the case where it is determined that the vehicle is in the static state and the motor is not operating;

the motor controller is configured to establish communication with the battery management unit after receiving the battery heating instruction;

the battery management unit is further configured to control both of the first switch and the second switch to be closed, and send switch closing information to the motor controller after the first switch and the second switch are both closed; and the motor controller is further configured to control the switch component so as to heat the battery pack after receiving the switch closing information.

10. A method for controlling a battery heating system which is applied to the battery heating system of claim 1, the method comprising:

determining, by the main controller based on the state parameter of the battery pack, whether the battery pack needs to be heated, and sending the battery heating request to the vehicle controller when it is determined that the battery pack needs to be heated, so as to enable the vehicle controller to send the battery heating instruction to the main controller according to the battery heating request in the case where it is determined that the vehicle is in the static state and the motor is not operating; and controlling, by the main controller based on the battery heating instruction, the first switch, the second switch and the switch component so as to heat the battery pack.

11. The method of claim 10, wherein the state parameter comprises a temperature and a state of charge (SOC) of the battery pack; and wherein determining, by the main controller based on the state parameter of the battery pack, whether the battery pack needs to be heated comprises:

determining, by the main controller, that the battery pack needs to be heated when the temperature of the battery pack satisfies a first preset condition and the SOC of the battery pack satisfies a second preset condition.

12. The method of claim 10, wherein controlling, by the main controller based on the battery heating instruction, the first switch, the second switch and the switch component so as to heat the battery pack comprises:

controlling, by the main controller based on the battery heating instruction, both of the first switch and the second switch to be closed, and providing the switch component with a driving signal to control the switch component to be turned on and turned off periodically, so as to enable heating of the battery pack.

13. The method of claim 10, wherein the main controller comprises a battery management unit and a motor controller; and
wherein determining, by the main controller based on the state parameter of the battery pack, whether the battery pack needs to be heated, and sending the battery heating request to the vehicle controller when it is determined that the battery pack needs to be heated, so as to enable the vehicle controller to send the battery heating instruction to the main controller according to the battery heating request in the case where it is determined that the vehicle is in the static state and the motor is not operating comprises:
determining, by the battery management unit based on the state parameter of the battery pack, whether the battery pack needs to be heated, and sending the battery heating request to the vehicle controller when it is determined that the battery pack needs to be heated, so as to enable the vehicle controller to send the battery heating instruction to the main controller according to the battery heating request in the case where it is determined that the vehicle is in the static state and the motor is not operating.

14. The method of claim 13, wherein controlling, by the main controller based on the battery heating instruction, the first switch, the second switch and the switch component so as to heat the battery pack comprises:
establishing, by the motor controller, communication with the battery management unit after receiving the battery heating instruction;
controlling, by the battery management unit, both of the first switch and the second switch to be closed, and sending switch closing information to the motor controller after the first switch and the second switch are both closed; and
controlling, by the motor controller, the switch component so as to heat the battery pack after receiving the switch closing information.

15. The method according to claim 14, wherein establishing, by the motor controller, communication with the battery management unit after receiving the battery heating instruction comprises:
sending, by the motor controller after receiving the battery heating instruction, a communication establishment request to the vehicle controller to cause the vehicle controller to enable communication between the motor controller and the battery management unit; and
performing communication in a handshake mode between the battery management unit and the motor controller.

16. The method of claim 10, wherein the system further comprises a current sensor disposed between the negative electrode of the battery pack and the second switch; and
wherein the method further comprises:
determining, by the main controller during heating of the battery pack, whether the system is in a normal operation mode based on at least one of the temperature of the battery pack, a voltage of the battery pack, the SOC of the battery pack, a heating current collected by the current sensor, and a temperature of the switch component;
controlling, by the main controller, the switch component to be turned off, and turning off the first switch and the second switch when the system is not in the normal operation mode; and
controlling, by the main controller, the switch component to be turned off, and
turning off the first switch and the second switch when the system is in the normal operation mode and the main controller determines that the temperature of the battery pack reaches a preset heating temperature.

17. The method of claim 16, wherein the main controller comprises a battery management unit and a motor controller; and
wherein determining, by the main controller during heating of the battery pack, whether the system is in a normal operation mode based on at least one of the temperature of the battery pack, a voltage of the battery pack, the SOC of the battery pack, a heating current collected by the current sensor, and a temperature of the switch component comprises:
determining, by the battery management unit during the heating of the battery pack, whether the system is in the normal operation mode based on at least one of the temperature of the battery pack, the voltage of the battery pack, the SOC of the battery pack, and the heating current collected by the current sensor.

18. The method according to claim 17, wherein controlling, by the main controller, the switch component to be turned off, and turning off the first switch and the second switch when the system is not in the normal operation mode comprises:
sending abnormal-state information to the motor controller when the battery management unit determines that the system is not in the normal operation mode;
controlling, by the motor controller when receiving the abnormal-state information, the switch component to be turned off, and sending first state information of the switch component to the battery management unit; and
turning off, by the battery management unit when receiving the first state information of the switch component, the first switch and the second switch.

19. The method of claim 16, wherein the main controller comprises a battery management unit and a motor controller; and
wherein determining, by the main controller during heating of the battery pack, whether the system is in a normal operation mode based on at least one of the temperature of the battery pack, a voltage of the battery pack, the SOC of the battery pack, a heating current collected by the current sensor, and a temperature of the switch component comprises:
determining, by the motor controller during the heating of the battery pack, whether the system is in the normal operation mode based on the temperature of the switch component.

20. The method of claim 19, wherein controlling, by the main controller, the switch component to be turned off, and turning off the first switch and the second switch when the system is not in the normal operation mode comprises:
controlling, by the motor controller when determining that the system is not in the normal operation mode, the switch component to be turned off, and sending second state information of the switch component to the battery management unit; and
turning off, by the battery management unit when receiving the second state information of the switch component, the first switch and the second switch.

* * * * *